United States Patent
Lorenz et al.

(10) Patent No.: US 10,540,207 B1
(45) Date of Patent: Jan. 21, 2020

(54) FAST, LOW MEMORY, CONSISTENT HASH USING AN INITIAL DISTRIBUTION

(71) Applicant: International Business Machines Corporation, Armonk, NY (US)

(72) Inventors: Dean Har'el Lorenz, Haifa (IL); Gal Mendelson, Adi (IL); Valleriya Perelman, Nesher (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/038,201

(22) Filed: Jul. 18, 2018

(51) Int. Cl.
*G06F 9/46* (2006.01)
*G06F 9/50* (2006.01)

(52) U.S. Cl.
CPC .... *G06F 9/5027* (2013.01); *G06F 2209/5014* (2013.01)

(58) Field of Classification Search
None
See application file for complete search history.

(56) References Cited

U.S. PATENT DOCUMENTS

| | | | | |
|---|---|---|---|---|
| 6,144,983 A * | 11/2000 | Klots | ............ | G06F 9/52 707/999.008 |
| 6,363,396 B1 * | 3/2002 | Klots | ............ | G06F 9/52 |
| 8,032,637 B2 * | 10/2011 | Prince, Jr. | ............ | G06F 9/5083 709/223 |
| 8,244,846 B2 * | 8/2012 | Wong | ............ | G06F 9/5083 709/223 |
| 8,438,574 B1 * | 5/2013 | Lyle | ............ | G06F 9/5033 718/100 |
| 8,854,952 B2 * | 10/2014 | Siegwart | ............ | H04L 47/125 370/221 |
| 8,918,372 B1 * | 12/2014 | Guo | ............ | G06F 16/1748 707/692 |
| 9,037,715 B2 * | 5/2015 | Lenz | ............ | G06F 9/5061 709/222 |
| 9,235,623 B2 | 1/2016 | Moyne et al. | | |
| 9,292,560 B2 * | 3/2016 | Attaluri | ............ | G06F 16/2255 |
| 9,311,359 B2 * | 4/2016 | Attaluri | ............ | G06F 16/2456 |
| 9,672,248 B2 * | 6/2017 | Attaluri | ............ | G06F 16/24544 |
| 9,729,444 B2 | 8/2017 | Wells | | |
| 10,097,628 B2 * | 10/2018 | Xu | ............ | H04L 67/1027 |
| 10,268,521 B2 * | 4/2019 | Choi | ............ | G06F 9/5072 |

(Continued)

*Primary Examiner* — Hiren P Patel
(74) *Attorney, Agent, or Firm* — Gregory J. Kirsch

(57) ABSTRACT

Embodiments of the present systems and methods may provide a consistent hash function that provides reduced memory use and complexity, reduced computational complexity, and relatively low numbers of keys that must be reshuffled compared to current techniques. For example, in an embodiment, a computer-implemented method for controlling computing resources may comprise storing a set of labels of potential resources comprising a plurality of labels of working resources allocated to actual resources and a plurality of labels of reserved resources available to be allocated, generating an initial assignment to one of the set of labels of potential resources, when the assignment to one of a set of labels of potential resources is to one of the labels of reserved resources, reassigning the request to another label of a resource selected from a subset of the labels of potential resources, and repeating the reassigning until the request is assigned to a label of a working resource.

18 Claims, 7 Drawing Sheets

(56) References Cited

U.S. PATENT DOCUMENTS

| | | | |
|---|---|---|---|
| 2008/0229056 A1* | 9/2008 | Agarwal | G06F 16/9014 |
| | | | 711/216 |
| 2010/0251002 A1* | 9/2010 | Sivasubramanian | |
| | | | G06F 9/5061 |
| | | | 714/2 |
| 2011/0154355 A1* | 6/2011 | Becker | G06F 9/5027 |
| | | | 718/104 |
| 2011/0225168 A1* | 9/2011 | Burroughs | G06F 9/3851 |
| | | | 707/747 |
| 2014/0067992 A1* | 3/2014 | Saeki | H04L 29/08549 |
| | | | 709/214 |
| 2014/0115560 A1* | 4/2014 | Hutchison | G06F 8/451 |
| | | | 717/113 |
| 2015/0043729 A1* | 2/2015 | Gopal | H04L 9/0625 |
| | | | 380/29 |
| 2015/0350103 A1* | 12/2015 | Bertram | H04L 47/70 |
| | | | 709/226 |
| 2015/0379009 A1* | 12/2015 | Reddy | G06F 16/2255 |
| | | | 707/747 |
| 2017/0220614 A1 | 8/2017 | Hardin et al. | |
| 2018/0067764 A1* | 3/2018 | Gui | G06F 9/4881 |
| 2018/0341596 A1* | 11/2018 | Teotia | G06F 12/1018 |

* cited by examiner

Fig. 2

201: Initialization:
202: A ← Anchor set
203: W ← Initial working set
204: R ← LIFO reserved buckets set
205: for i ∈ A\W do
206:     H[i] ← W ∪ R
207:     R:push(i)
208:
209: function REMOVEBUCKET(b)
210:     W ← W\b
211:     H(b) ← W
212:     R:push(b)
213:
214: function ADDBUCKET( )
215:     b ← R:pop()
216:     W ← W ∪ b
217:     return b
218:
219: function GETBUCKET(key)
220:     b = UHASH(key;A)
221:     while b ∉ W do
222:         b = UHASH(key;H[b])
223:     return b

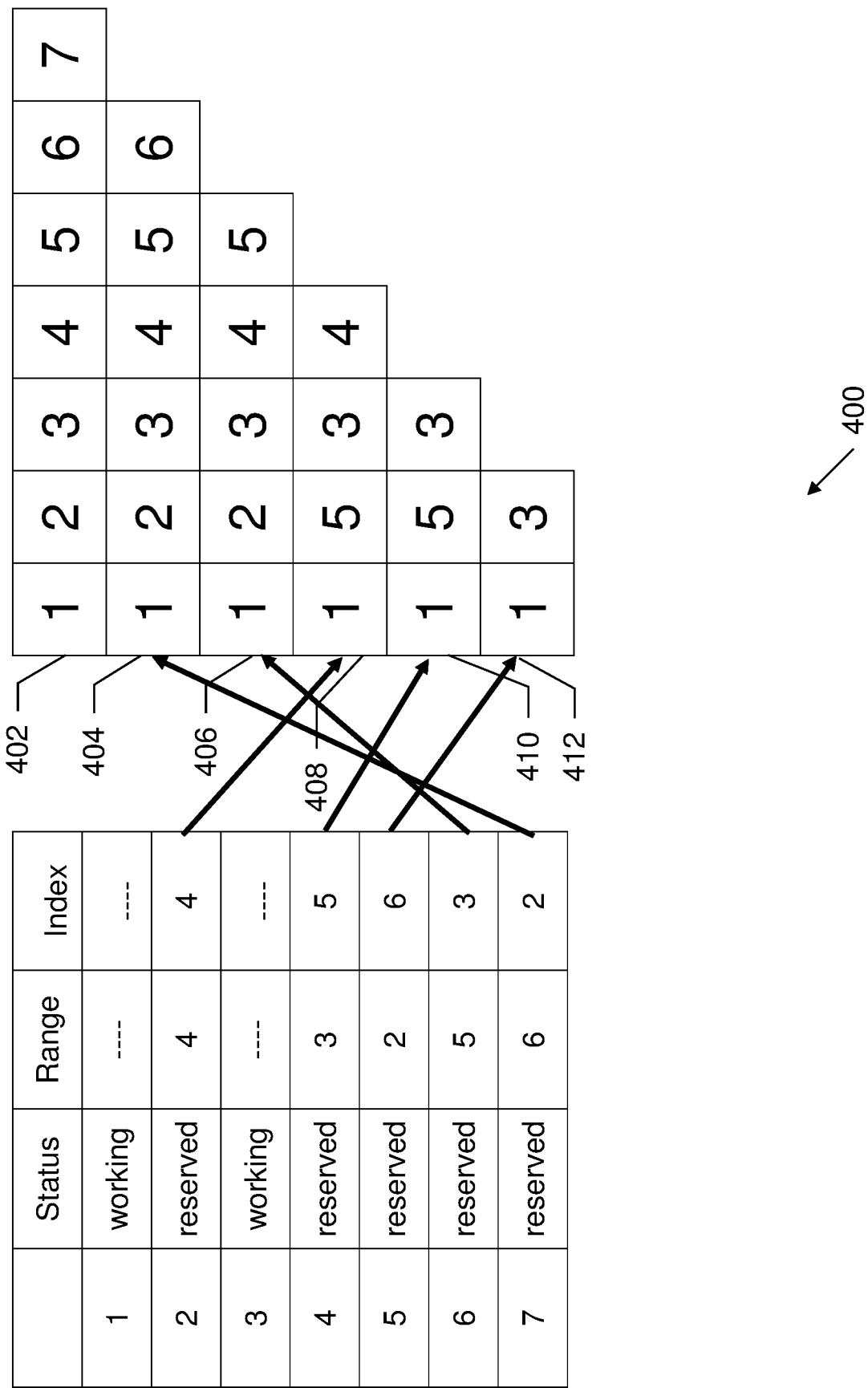

Fig. 4b

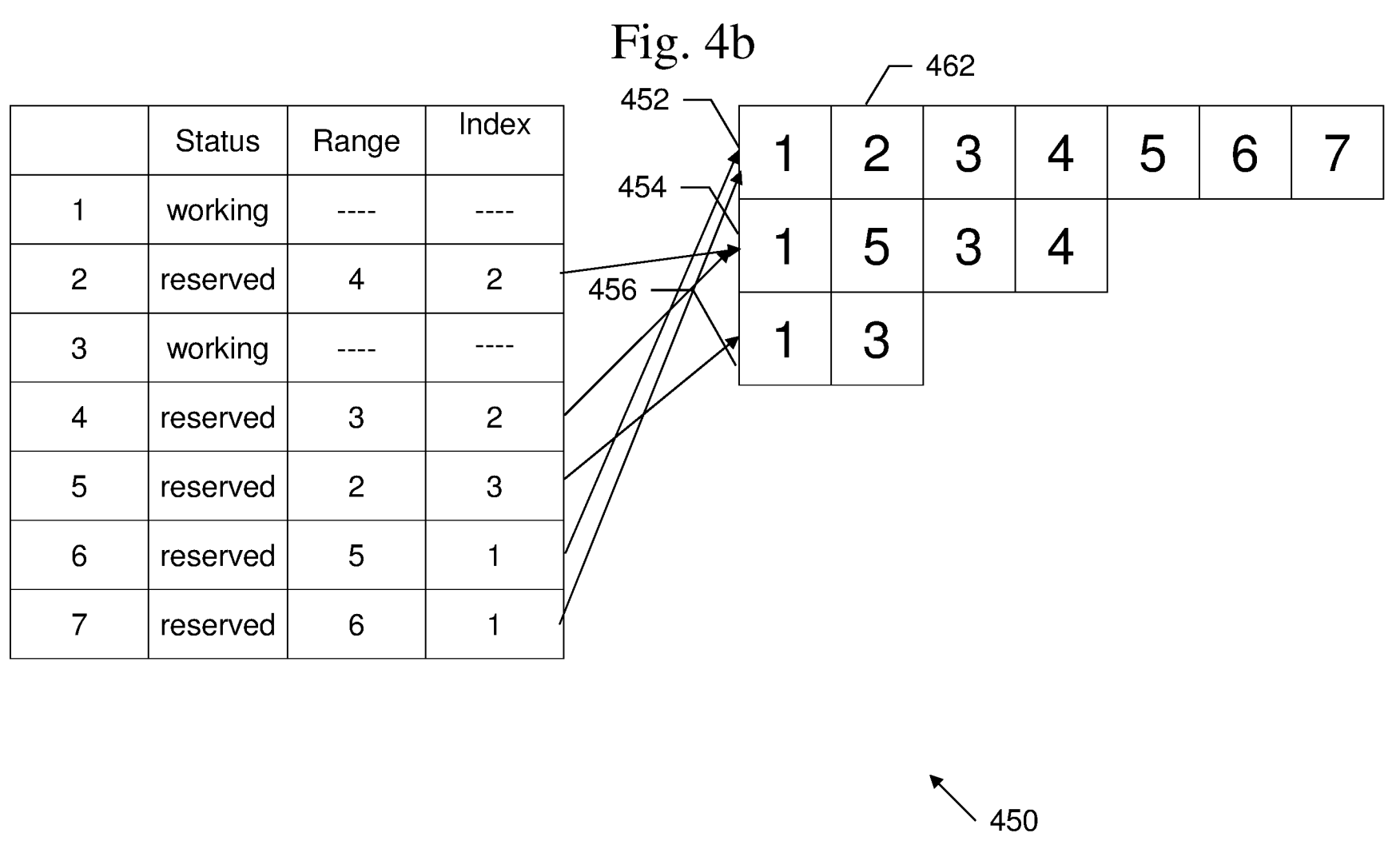

|   | Status | Range | Index |
|---|--------|-------|-------|
| 1 | working | --- | --- |
| 2 | reserved | 4 | 2 |
| 3 | working | --- | --- |
| 4 | reserved | 3 | 2 |
| 5 | reserved | 2 | 3 |
| 6 | reserved | 5 | 1 |
| 7 | reserved | 6 | 1 |

| 1 | 2 | 3 | 4 | 5 | 6 | 7 |
|---|---|---|---|---|---|---|
| 1 | 5 | 3 | 4 |   |   |   |
| 1 | 3 |   |   |   |   |   |

452, 454, 456, 462, 450

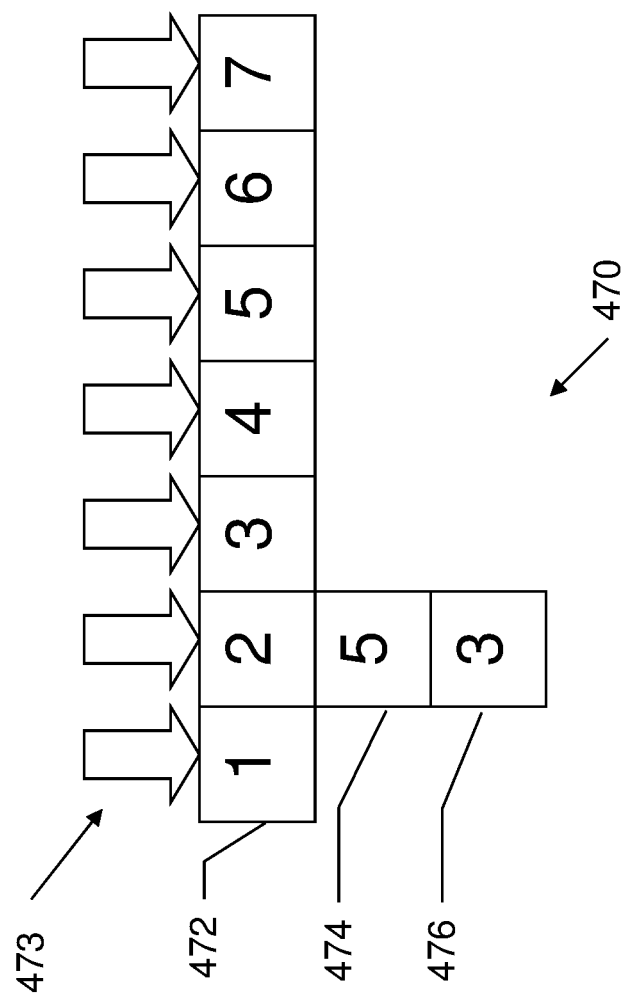

FAST, LOW MEMORY, CONSISTENT HASH USING AN INITIAL DISTRIBUTION

BACKGROUND

The present invention relates to techniques for performing distribution of objects or processing tasks using consistent hashing techniques with an initial distribution of processing.

One issue relating to distributed processing is distributing objects or processing tasks (keys) among the resources (buckets) that are available to store and/or process the objects and tasks. Conventional systems may distribute keys using a conventional hash function, such as generating a hash of an object or task, then finding the modulus to the base of the number of buckets, and distributing accordingly. In this situation, if a bucket is added or removed, all or almost all keys must be redistributed.

The use of a special hash function, known as a consistent hash function, may greatly reduce the keys that must be redistributed when the number of buckets changes. For example, an existing consistent hash function may map keys to a set of buckets. Similar to a conventional hash function, the key set (for example, web requests) may be very large and not evenly distributed, while the bucket set (for example, a population of web servers) may be finite. The hash function may deterministically distribute the keys among the buckets in an even manner. Unlike conventional hashing, existing consistent hashing minimizes the mapping changes (called "reshuffling") when the set of buckets changes (for example, when web servers are added or removed). Existing consistent hashing has many applications and is fundamental to web caching, storage, in-memory caches, distributed hash tables, etc.

There are a number of conventional hash functions and implementations, such as the existing consistent hash function, the existing rendezvous consistent hash function, the existing jump consistent hash function, the existing GOOGLE® Maglev hash function, and the existing permutation-based hash function. Each of these functions and implementation has advantages and disadvantages. However, typical disadvantages may include high memory use and complexity, high computational complexity, and relatively high numbers of keys that must be reshuffled.

A need arises for techniques that implement a consistent hash function that provides reduced memory use and complexity, reduced computational complexity, and relatively low numbers of keys that must be reshuffled compared to current techniques.

SUMMARY

Embodiments of the present systems and methods may provide a consistent hash function that provides reduced memory use and complexity, reduced computational complexity, and relatively low numbers of keys that must be reshuffled compared to current techniques.

For example, in an embodiment, a computer-implemented method for controlling computing resources may comprise storing a set of labels of potential resources comprising a plurality of labels of working resources allocated to actual resources and a plurality of labels of reserved resources available to be allocated, generating an initial assignment to one of the set of labels of potential resources, when the assignment to one of a set of labels of potential resources is to one of the labels of reserved resources, reassigning the request to another label of a resource selected from a subset of the labels of potential resources, and repeating the reassigning until the request is assigned to a label of a working resource.

In embodiments, the subset may comprise the plurality of labels of working resources and a portion of the labels of reserved resources bounded by the currently assigned label of a resource. The another label of a resource may be selected at random from the set of labels of potential resources or the subset of labels of potential resources. The method may further comprise removing an actual resource by removing a label allocated to the resource from the labels of working resources by decrementing a range value indicating a last label of a working resource in the stored set of labels of potential resources to exclude the removed label allocated to the resource. The method may further comprise removing an actual resource by removing a label allocated to the resource from the labels of working resources by storing the set of labels of potential resources before the removal, with a last label of a working resource before the removal taking the place of the label allocated to the removed resource and decrementing a range value indicating a last label of a working resource in the stored set of labels of potential resources to exclude the label allocated to the removed resource. The method may further comprise removing an actual resource by removing a label allocated to the resource from the labels of working resources by moving a label of a last working resource before the removal to take the place of the label allocated to the removed resource and storing only the label of the resource that took the place of the label allocated to the removed resource and decrementing a range value indicating a label of a last working resource in the stored set of labels of potential resources. The method may further comprise adding an actual resource by undoing a removal of the label of the last removed resource and allocating the undone label to the added actual resource. The set of labels of potential resources may comprise a plurality of labels for at least some of the potential resources and a number of labels for each potential resource comprises a weight given to the potential resource.

In an embodiment, a system for controlling computing resources may comprise a processor, memory accessible by the processor, and computer program instructions stored in the memory and executable by the processor to perform storing a set of labels of potential resources comprising a plurality of labels of working resources allocated to actual resources and a plurality of labels of reserved resources available to be allocated, generating an initial assignment to one of the set of labels of potential resources, when the assignment to one of a set of labels of potential resources is to one of the labels of reserved resources, reassigning the request to another label of a resource selected from a subset of the labels of potential resources, and repeating the reassigning until the request is assigned to a label of a working resource.

In an embodiment, a computer program product for controlling computing resources may comprise a non-transitory computer readable storage having program instructions embodied therewith, the program instructions executable by a computer, to cause the computer to perform a method comprising storing a set of labels of potential resources comprising a plurality of labels of working resources allocated to actual resources and a plurality of labels of reserved resources available to be allocated, generating an initial assignment to one of the set of labels of potential resources, when the assignment to one of a set of labels of potential resources is to one of the labels of reserved resources, reassigning the request to another label of a resource selected from a subset of the labels of potential resources, and repeating the reassigning until the request is assigned to a label of a working resource.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary flow diagram of an embodiment of processes involved in the present techniques.

FIG. 4a is an exemplary diagram of an embodiment of processes involved in the present techniques.

FIG. 4b is an exemplary diagram of an embodiment of processes involved in the present techniques.

FIG. 4c is an exemplary diagram of an embodiment of processes involved in the present techniques.

DETAILED DESCRIPTION

Embodiments of the present systems and methods may provide a consistent hash function that provides reduced memory use and complexity, reduced computational complexity, and relatively low numbers of keys that must be reshuffled compared to current techniques.

In embodiments, the present techniques may start with an initial mapping to a 'hypothetical' larger set of buckets, according to some simple (typically not consistent) hash function. This may be termed the anchor distribution function. The initial anchor distribution may be performed by any hash or any distribution. In the event that the anchor set is not large enough, and buckets are to be added beyond the anchor set, then a hash function, for example, the Jump hash function, or a generalization thereof, may be utilized. For example, a consistent hash function that is a broad generalization of the approach of jump consistent hashing may be used. In this example, the bucket to be mapped may be chosen by iteratively calculating how many buckets need to be added or removed before the key is remapped (reshuffled). By starting from the anchor distribution, the computational complexity is related to the difference between the anchor bucket set and the current bucket set, rather than to the total number of buckets. This means that changes in the bucket set that get closer to the anchor set (such as the typical case, where a server is added in place of a failed one) may not add to the computational complexity (in fact, such changes may lower the computational complexity). Furthermore, unlike jump consistent hashing, arbitrary (out of order) removals and additions to bucket set may be allowed. The memory requirements of this example are on the order of the number of changes, while the computation complexity is almost constant. For example, for removal of up to 10% of the anchor set, the expected number of iterations is less than 10/9, and for removal of up to 50% of the anchor set the expected number of iterations is less than 2. For the special case of ordered changes, memory use may be constant.

Figure 1:
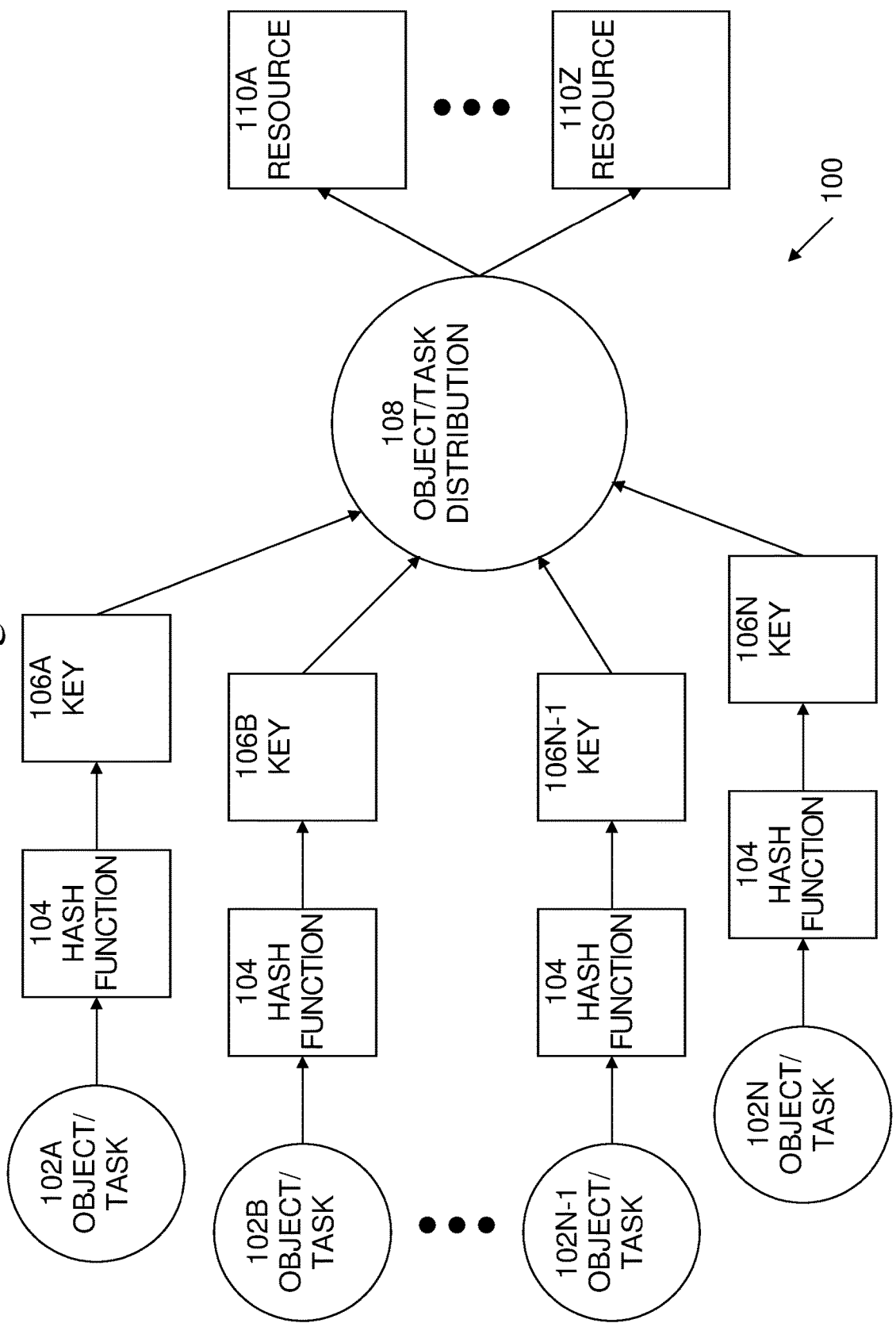
FIG. 1 illustrates an exemplary system in which described embodiments may be implemented.

An exemplary block diagram of a system 100, in which techniques of the present systems and methods may be implemented is shown in FIG. 1. In this example, system 100 includes a plurality of objects and/or tasks 102A-N, a hash function 104, a plurality of keys 106A-N, an object/task distribution block 108, and a plurality of resources 110A-Z. Objects and/or tasks 102A-N may include a plurality of computing objects, such as data files, transactions, executable files, etc., that may be mapped, allocated, or assigned to storage resources (buckets). Objects and/or tasks 102A-N may include a plurality of computing tasks, such as executing processes, processing to be performed, etc., that may be mapped, allocated, or assigned to processing resources. Resources 110A-Z may include a plurality of storage and/or processing resources to which objects and/or tasks 102A-N are mapped, allocated, or assigned. For example, resources 110A-Z may include servers to perform computing and/or storage, storage resources, network resources, etc. The present techniques are applicable to any type of computing resource, such storage controllers, distributed caches, web caches, key-value storage, and embedded systems such as hardware routers and switches. Even though the architectures of these devices may vary, the present techniques may be applied advantageously to such devices. Hash function 104 may include one or more hash functions and processes that may generate hash keys 106A-N for objects and/or tasks 102A-N. Object/task distribution block 108 may distribute mapping, allocation, or assignment of objects and/or tasks 102A-N to resources 110A-Z based on the generated hash keys 106A-N.

An exemplary data flow diagram of processes 200 involved in the present techniques is shown in FIG. 2. In this example, the processes are shown in the form of pseudo-code. Embodiments of the present systems and methods, which implement a consistent hash algorithm, in addition to achieving the minimal disruption property and balance, may support dynamic and often unstructured changes to the working bucket set. This may happen due to unexpected events such as random bucket failures, standard proactive operations such as maintenance, or when scaling-up and down the system according to some given policy.

Embodiments of the present systems and methods may utilize several sets of buckets. One such set may be termed the "working set", denoted by "W" 203, which includes a set of buckets that are in use at a given time. Another set may be termed the "anchor set", which is a bucket set that is larger than the bucket set that is initially in use, the initial working set W. The Anchor set may be denoted by "A" 201. Such embodiments may provide fast and arbitrary changes to be made to the working bucket set W, while showing little sensitivity to the anchor set size. Another set may be termed the "reserved set", denoted by "R" 204. As mentioned, at any time the present systems and methods may work with a larger set A of buckets than the working set $W \subset A$. R may be defined as R=A\W.

A last-in-first-out (LIFO) order may be maintained within the set R. Thus, the last removed bucket admitted to R, is the first to leave it upon bucket addition. Other embodiments may be used, but this embodiment may provide an efficient implementation. In this embodiment, upon bucket addition, the system returns to its previous state, that is, the state before the last bucket removal. This may reduce memory usage and provide good performance.

Figure 3:
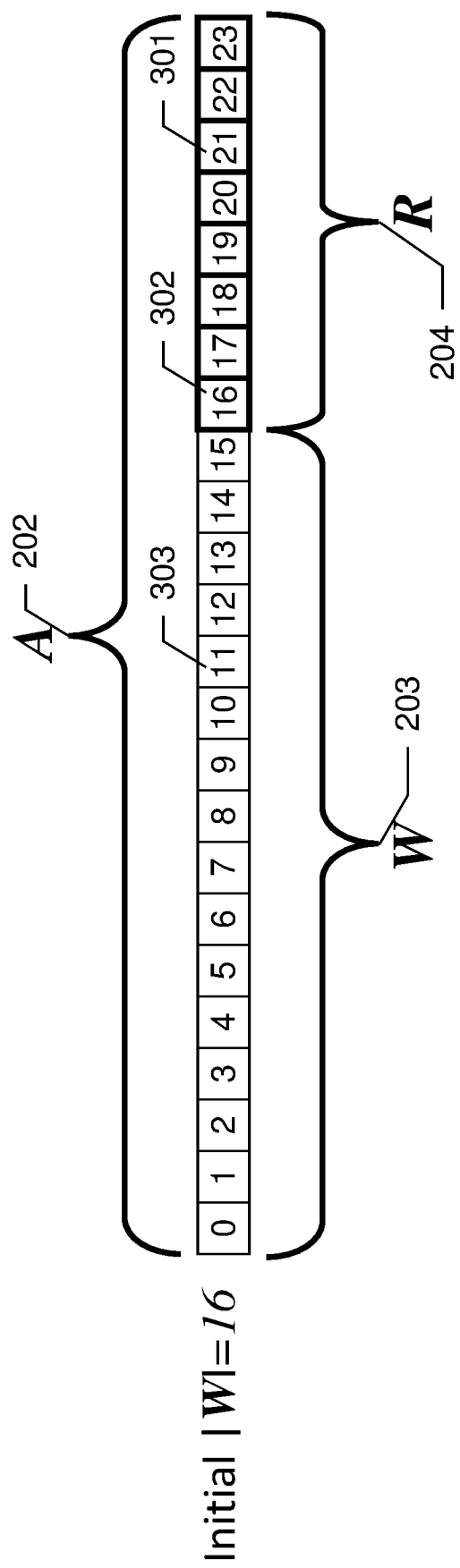
FIG. 3 is an exemplary diagram of an embodiment of storage techniques involved in the present techniques.

Each key may be associated with a path, such as an ordered subset of the anchor set, in the anchor set where the last hop in that path is the bucket to which that key is admitted. This last hop is the first working bucket along the path. At first, for each key, this path may or may not include initially reserved buckets and it terminates at the first initially working bucket. At 201, an initial distribution of keys may be made by evenly distributing each key to one of the buckets of the anchor set A 202. Each live key may be pushed onto the working bucket set at 205-207. An example of an initial bucket arrangement is shown in FIG. 3.

A process 209 for removing a live bucket is shown at 210-212 of FIG. 2. In this process, the last bucket in the working bucket set W 203, such as bucket 15, shown in FIG. 3, is moved to the reserved bucket set R 204. A process 214 for adding a live bucket is shown at 215-217 of FIG. 2. In this process, the first bucket in the reserved bucket set R 204, such as bucket 16, shown in FIG. 3, is moved to the working bucket set W 203.

When a new bucket b is added 214, that is, moved from the reserved set to the working set, some key paths which included b are now shortened and terminate earlier at b. Similarly, when a bucket b is removed 209, each key's path which previously terminated at b is now extended, where the new (and last) hop for such a path is uniformly chosen (using an appropriate hash function) among the remaining working set.

A process 219 for determining a key's first hop on its anchor path is shown at 220-223 of FIG. 2. The initial hash applied on an entering key determines its first hop on its anchor path. This first hash may be uniform across the anchor set, such as is produced by initialization process 201. However, the situation may arise that an entering key is initially hashed into a reserved bucket. A key may be hashed repeatedly to strictly decreasing subsets of the anchor set until a live bucket is found. This process may be applied both in the initial case, and in cases where buckets have been dynamically removed (or added). This is because the initial case may be viewed as the initial reserve set includes buckets that have already been removed. Note that these are ordered removes; as such, there is no need to re-enumerate and little new state information, just the current length. As the process may be so memory efficient with ordered removes (even if intermixed with random removes), it may be less sensitive to the difference between the anchor set A and the working set W. Computational lookup effort relates to the log of A/W, computational effort may also not be very sensitive. Accordingly, large anchor sets may be used to support many additions. Likewise, large working sets may be used to support either a large number of back-end servers/resources or back-end servers/resources with weights, as described below.

In this case, process 219 may be used. For example, when a bucket is removed at runtime, consistency may be maintained by remapping only those keys that were mapped to the removed bucket to another bucket. In FIG. 3, a key may get an initial hash to bucket 21 301, using, for example, at 220 of process 219, a hash function of "24 (size of anchor set 202)*random(seed=k)=21". As bucket 21 301 is not in the working set W 203, for example, because it was removed, then at 221-222, another iteration of hashing may be performed, using, for example, at 222, a hash function of "21 (the bucket from the previous iteration)*r.next( )=16". This iteration yields bucket 16 302, which is still not in the working set W 203, for example, because it was removed. At 221-222 another iteration may be performed, using 16 (the bucket from the previous iteration)*r.next=11. This iteration yields bucket 11 303, which is in the working set W 203. The iterations stop once a working bucket is selected. Accordingly, at 223, bucket 11 303 is returned at the assigned bucket.

Consistency may be maintained through the iterative selection of buckets for smaller and smaller sets and only when a bucket is removed (the "path"). An example 400 of an embodiment of a process of maintaining consistency is shown in FIG. 4a. In this example, the anchor set A= {1, 2, . . . , 7} and an initial working set W={1, 2, . . . , 5}. The process shown in FIG. 4a relates to saving these sets and to enumerating them for easy random selection. Initial ("natural") enumeration is shown in row 402. The naïve implementation in this example saves the entire set (row) each time, but still minimizes the re-enumeration. When a bucket is removed at runtime, consistency may be maintained by remapping only those keys that were mapped to the removed bucket to another bucket. For example, when in row 402 bucket 7 is removed (an ordered removal), a new row 404 may be saved. No re-enumeration is necessary as bucket 7 was removed and the remaining buckets are unchanged. When an unordered or random removal occurs, re-enumeration may be necessary. For example, in row 408, bucket 2 is removed (for example, due to failure). Only bucket 5 need be re-enumerated, as its previous enumeration "5" is larger than the remaining set. Its new enumeration is "2", meaning that if random selection on row 408 chooses item #2, bucket 5 will be used In this example, consecutive removals of buckets 7, 6, 2, 4, then 5 are shown, where buckets 6 and 7 are removed during initialization. In this example, the removals of 7, 6, and 4 are ordered removals, while the removals of 2 and 5 are unordered removals.

An example 450 of an embodiment of a process of maintaining consistency is shown in FIG. 4b. In this embodiment, when the removal is ordered, the new state of the buckets need not be copied to a new row, rather the same row may be used with the range of buckets (last bucket or number of buckets) decremented. Thus, the row may be maintained, with the last working bucket indicated by range information. For example, as shown in FIG. 4b, at initialization, if the reserved buckets are admitted by decreasing value order, all these buckets can point to the first row 452 with corresponding decreasing ranges.

A bucket removal is unordered if the bucket that is removed is not the last bucket that is observed by the previous removed bucket. When such a removal happens, a new line may be created in which the last entry of the previous line may be assigned to the location of the removed bucket. For example, in line 452, bucket 2 may be removed. A new line 454 may be created in which the last working bucket in row 452, bucket 5, is assigned to the location vacated by bucket 2, and the working bucket range may be decremented. As in FIG. 4a, only bucket 5 need be re-enumerated, as its previous enumeration "5" is larger than the remaining set. Its new enumeration is "2", meaning that if random selection on row 454 chooses item #2, bucket 5 will be used In this example, consecutive removals of buckets 7, 6, 2, 4, then 5 are shown, where buckets 6 and 7 are removed during initialization. In this example, the removals of 7, 6, and 4 are ordered removals, while the removals of 2 and 5 are unordered removals.

By leveraging ordered removals, as shown in FIG. 4b, memory usage may be reduced, especially at initialization, for example, with a large reserved set, or when scaling a system at run time, for example, when servers/resources are removed intentionally, they may be removed in order.

An example 470 of an embodiment of a process of maintaining consistency is shown in FIG. 4c. In this embodiment, when the removal is ordered, the new state of the buckets need not be copied to a new row, rather the same row may be used with the range of buckets (last bucket or number of buckets) decremented. Thus, the row may be maintained, with the last working bucket indicated by range information. For example, as shown in FIG. 4c, at initialization, if the reserved buckets are admitted by decreasing value order, all these buckets can point to the first row 472 with corresponding decreasing ranges 473. For unordered removals, memory usage may be reduced even further by saving/copying only buckets which are changed from their initial enumerations, for example buckets 5 and 3 in FIG. 4c.

This technique may be very efficient in the way the state is saved to handle random failures. In particular, it is not necessary to save any new state (beyond the identity of the removal itself) if the last server/resource is removed, an ordered removal, such as due to common scale-down events and the initialization "removals" from the anchor set. For each random or unordered failure, only a few entries need be copied. Initially, buckets may be enumerated by their IDs. Upon bucket failure, the enumeration may be changed only for a minimal set of buckets, which may minimize reshuffling. Since only random failures require any change in enumeration, and at most one change is needed, the total number of enumeration changes saved as the current state may be fewer than the number of random failures. Further, the number of state changes may also be fewer than the total number of random failures. Random removals are typically not planned and are either fixed and re-added or replacement servers/resources are used. Since servers/resources may be added by "forgetting" removals, the state relates to the "net" number of random removals rather than the total number.

For example, in FIG. 4c, when bucket 2 is removed from row 472, a new line 474 may be created in which the last working bucket in row 472, bucket 5, may be assigned to the location vacated by bucket 2, and the working bucket range may be decremented. Only bucket 5 need be re-enumerated, as its previous enumeration "5" is larger than the remaining set. Likewise, only bucket 5 need be stored in line 474, as the remaining bucket assignments may be obtained from row 472. Its new enumeration is "2", meaning that if random selection on row 454 chooses item #2, bucket 5 will be used. In this example, consecutive removals of buckets 7, 6, 2, 4, then 5 are shown, where buckets 6 and 7 are removed during initialization. In this example, the removals of 7, 6, and 4 are ordered removals, while the removals of 2 and 5 are unordered removals. Likewise, when bucket 5 is removed, a new line 474 may be created in which the last working bucket in row 472, bucket 3, may be assigned to the location vacated by bucket 5, and the working bucket range may be decremented.

Resources may be added by essentially undoing remove operations and reassigning the bucket (label) from the previously removed resource to the newly added one. While removed labels (buckets) are "random"—any resource may need to be removed due the failure, added resource labels do not need to be random, the process may choose any unused label. It is to be noted that buckets are not back-end servers or other resources. Rather, the (consistent) hash maps keys to buckets and then the buckets are mapped to servers/resources. This means that bucket identities are fully controllable.

For example, in FIG. 4a, if a bucket is added, the reserved bucket following the last working bucket may be used and moved to the working set simply by incrementing the working bucket range. Thus, at line 406 in FIG. 4a, if a bucket is added, the last removed bucket, bucket 6 416, may be added back into the working set. Likewise, at line 452 in FIG. 4b, bucket 6 may be added back into the working set by updating the range information for line 452 to include bucket 6.

As another example, line 412 in FIG. 4a has resulted from a number of ordered and unordered removals. A bucket may be added to line 412 by using the reserved bucket following the last working bucket by incrementing the working bucket range. In this case, any bucket not already in use may be selected as the bucket to be added to the working bucket range. Likewise, a bucket may be added to line 456 of FIG. 4b and to line 476 of FIG. 4c by incrementing the working bucket range. In these examples, any bucket not already in use may be selected as the bucket to be added to the working bucket range.

In the present systems and methods, as the number of servers/resources does not change much (regardless of how many add/remove actions were made), the final state will be very close to the initial state. Moreover, it is not necessary to prepare in advance for random removals. The extra computation for the remove only when a remove occurs and only when the removed bucket is actually picked, although in this case the state may be copied in preparation. Adding servers/resources may decrease the computational effort and remove saved states.

As the number of reserved and working buckets may be large without excessive computational or memory overhead, in embodiments, more than one bucket may be assigned to each server or other resource. Further, as the computing power and/or storage capacity of various servers or other resources may differ, the number of buckets assigned to each server or other resource may also differ. This may provide the capability to weight the distribution of each server or other resource as desired. Further, as the total number of buckets may be very large, the weighting granularity may be quite fine. For example, an average server or other resource may be assigned to 10 buckets, while a more powerful server/resource may be assigned to 20 buckets and a less powerful server/resource may be assigned to 5 buckets. If finer granularity is desired, the same servers/resources may be assigned to 100, 200, and 50 buckets, respectively. The actual assignments, weighting, and granularity may be adjusted as desired.

Figure 5:
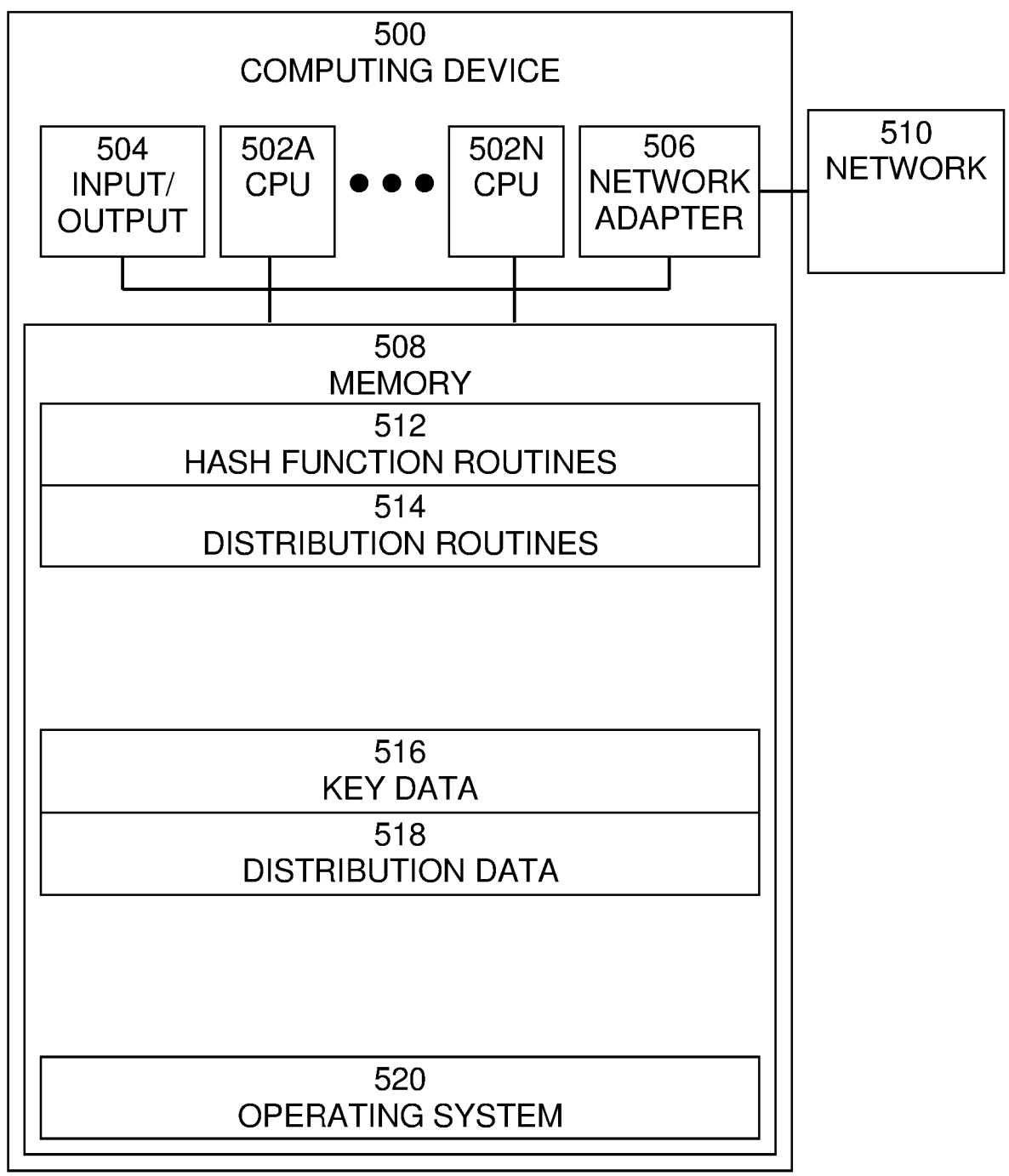
FIG. 5 is an exemplary block diagram of a computer system in which processes involved in the embodiments described herein may be implemented.

An exemplary block diagram of a computer system 502, in which processes involved in the embodiments described herein may be implemented, is shown in FIG. 5. Computer system 502 may be implemented using one or more programmed general-purpose computer systems, such as embedded processors, systems on a chip, personal computers, workstations, server systems, and minicomputers or mainframe computers, or in distributed, networked computing environments. Computer system 502 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 502 is implemented as a single multi-processor computer system, in which multiple processors 502A-502N share system resources, such as memory 508, input/output circuitry 504, and network adapter 506. However, the present communications systems and methods also include embodiments in which computer system 502 is implemented as a plurality of networked computer systems, which may be single-processor computer systems, multi-processor computer systems, or a mix thereof.

The present techniques are applicable to any type of computing resource, such storage controllers, distributed caches, web caches, key-value storage, and embedded systems such as hardware routers and switches. Even though the architectures of these devices may vary, the present techniques may be applied advantageously to such devices.

Input/output circuitry 504 provides the capability to input data to, or output data from, computer system 502. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 502. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 502 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 5 may be implemented on a current leader server. Likewise, in embodiments, at least a portion of the software shown in FIG. 5 may be implemented on a computer system other than the current leader server.

In the example shown in FIG. 5, memory 508 may include hash function routines 512, distribution routines 514, key data 516, distribution data 518, and operating system 520. Hash function routines 512 may include software routines to generate hash keys, which may be stored as key data 516, for objects and/or tasks that are to be distributed. Distribution routines 514 may include software routines to distribute objects and/or tasks among resources, for example, according to the processes shown in FIGS. 2 and 3. Distribution data 518 may include data used by distribution routines 514, such as that data described above in relation to FIGS. 2 and 3. Operating system 520 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for controlling computing resources comprising:
   storing a set of labels of potential resources comprising a plurality of labels of working resources allocated to actual resources and a plurality of labels of reserved resources available to be allocated;
   generating an initial assignment to one of the set of labels of potential resources;
   when the assignment to one of a set of labels of potential resources is to one of the labels of reserved resources, reassigning a request to another label of a resource selected from a subset of the labels of potential resources;
   repeating the reassigning until the request is assigned to a label of a working resource;
   removing an actual resource by removing a label allocated to the actual resource from the labels of working resources by:
      moving a label of a last working resource before the removal to take the place of the label allocated to the removed resource and storing only the label of the resource that took the place of the label allocated to the removed resource; and
      decrementing a range value indicating the label of the last working resource in the stored set of labels of potential resources; and
   adding another actual resource by undoing a removal of the label of the last removed resource and allocating the undone label to the added actual resource.

2. The method of claim 1, wherein the subset comprises the plurality of labels of working resources and a portion of the labels of reserved resources bounded by the currently assigned label of a resource.

3. The method of claim 2, wherein another label of a resource is selected at random from the set of labels of potential resources or the subset of labels of potential resources.

4. The method of claim 1, further comprising removing an actual resource by removing a label allocated to the resource from the labels of working resources by decrementing a range value indicating a last label of a working resource in the stored set of labels of potential resources to exclude the removed label allocated to the resource.

5. The method of claim 1, further comprising removing an actual resource by removing a label allocated to the resource from the labels of working resources by:
storing the set of labels of potential resources before the removal, with a last label of a working resource before the removal taking the place of the label allocated to the removed resource; and
decrementing a range value indicating a last label of a working resource in the stored set of labels of potential resources to exclude the label allocated to the removed resource.

6. The method of claim 1, wherein the set of labels of potential resources comprises a plurality of labels for at least some of the potential resources and a number of labels for each potential resource comprises a weight given to the potential resource.

7. A system for controlling computing resources, the system comprising a processor, memory accessible by the processor, and computer program instructions stored in the memory and executable by the processor to perform:
storing a set of labels of potential resources comprising a plurality of labels of working resources allocated to actual resources and a plurality of labels of reserved resources available to be allocated;
generating an initial assignment to one of the set of labels of potential resources;
when the assignment to one of a set of labels of potential resources is to one of the labels of reserved resources, reassigning the request to another label of a resource selected from a subset of the labels of potential resources;
repeating the reassigning until the request is assigned to a label of a working resource;
removing an actual resource by removing a label allocated to the actual resource from the labels of working resources by:
moving a label of a last working resource before the removal to take the place of the label allocated to the removed resource and storing only the label of the resource that took the place of the label allocated to the removed resource; and
decrementing a range value indicating the label of the last working resource in the stored set of labels of potential resources; and
adding another actual resource by undoing a removal of the label of the last removed resource and allocating the undone label to the added actual resource.

8. The system of claim 7, wherein the subset comprises the plurality of labels of working resources and a portion of the labels of reserved resources bounded by the currently assigned label of a resource.

9. The system of claim 8, wherein another label of a resource is selected at random from the set of labels of potential resources or the subset of labels of potential resources.

10. The system of claim 7, further comprising removing an actual resource by removing a label allocated to the resource from the labels of working resources by decrementing a range value indicating a last label of a working resource in the stored set of labels of potential resources to exclude the removed label allocated to the resource.

11. The system of claim 7, further comprising removing an actual resource by removing a label allocated to the resource from the labels of working resources by:
storing the set of labels of potential resources before the removal, with a last label of a working resource before the removal taking the place of the label allocated to the removed resource; and
decrementing a range value indicating a last label of a working resource in the stored set of labels of potential resources to exclude the label allocated to the removed resource.

12. The system of claim 7, wherein the set of labels of potential resources comprises a plurality of labels for at least some of the potential resources and a number of labels for each potential resource comprises a weight given to the potential resource.

13. A computer program product for controlling computing resources, the computer program product comprising a non-transitory computer readable storage having program instructions embodied therewith, the program instructions executable by a computer, to cause the computer to perform a method comprising:
storing a set of labels of potential resources comprising a plurality of labels of working resources allocated to actual resources and a plurality of labels of reserved resources available to be allocated;
generating an initial assignment to one of the set of labels of potential resources;
when the assignment to one of a set of labels of potential resources is to one of the labels of reserved resources, reassigning the request to another label of a resource selected from a subset of the labels of potential resources; and
repeating the reassigning until the request is assigned to a label of a working resource;
removing an actual resource by removing a label allocated to the actual resource from the labels of working resources by:
moving a label of a last working resource before the removal to take the place of the label allocated to the removed resource and storing only the label of the resource that took the place of the label allocated to the removed resource; and
decrementing a range value indicating the label of the last working resource in the stored set of labels of potential resources; and
adding another actual resource by undoing a removal of the label of the last removed resource and allocating the undone label to the added actual resource.

14. The computer program product of claim 13, wherein the subset comprises the plurality of labels of working resources and a portion of the labels of reserved resources bounded by the currently assigned label of a resource.

15. The computer program product of claim 14, wherein another label of a resource is selected at random from the set of labels of potential resources or the subset of labels of potential resources.

16. The computer program product of claim 13, further comprising removing an actual resource by removing a label allocated to the resource from the labels of working resources by decrementing a range value indicating a last label of a working resource in the stored set of labels of potential resources to exclude the removed label allocated to the resource.

17. The computer program product of claim 13, further comprising removing an actual resource by removing a label allocated to the resource from the labels of working resources by:
- storing the set of labels of potential resources before the removal, with a last label of a working resource before the removal taking the place of the label allocated to the removed resource; and
- decrementing a range value indicating a last label of a working resource in the stored set of labels of potential resources to exclude the label allocated to the removed resource.

18. The computer program product of claim 13, wherein the set of labels of potential resources comprises a plurality of labels for at least some of the potential resources and a number of labels for each potential resource comprises a weight given to the potential resource.

\* \* \* \* \*